(12) United States Patent
Hatcher et al.

(10) Patent No.: US 11,040,521 B2
(45) Date of Patent: *Jun. 22, 2021

(54) MULTILAYER COMPOSITE MATERIAL AND METHOD FOR MANUFACTURING

(71) Applicant: DSM IP Assets B.V., Heerlen (NL)

(72) Inventors: Wesley Edward Hatcher, Echt (NL); Christopher Michael Adams, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/467,537

(22) PCT Filed: Dec. 21, 2017

(86) PCT No.: PCT/EP2017/084211
§ 371 (c)(1),
(2) Date: Jun. 7, 2019

(87) PCT Pub. No.: WO2018/122120
PCT Pub. Date: Jul. 5, 2018

(65) Prior Publication Data
US 2019/0322090 A1    Oct. 24, 2019

Related U.S. Application Data

(60) Provisional application No. 62/439,996, filed on Dec. 29, 2016.

(30) Foreign Application Priority Data

Jan. 24, 2017   (EP) .................................. 17152803.7

(51) Int. Cl.
*B32B 27/12* (2006.01)
*A41D 31/102* (2019.01)
*A41D 31/24* (2019.01)

(52) U.S. Cl.
CPC ............ *B32B 27/12* (2013.01); *A41D 31/102* (2019.02); *A41D 31/245* (2019.02);
(Continued)

(58) Field of Classification Search
CPC .... A41D 31/102; A41D 31/245; B32B 15/14; B32B 2260/021; B32B 2260/023;
(Continued)

(56) References Cited

U.S. PATENT DOCUMENTS

| 5,470,632 A | 11/1995 | Meldner et al. |
| 7,389,718 B1 | 6/2008 | Carter et al. |

(Continued)

FOREIGN PATENT DOCUMENTS

WO    2016/113637    7/2016

OTHER PUBLICATIONS

International Search Report for PCT/EP2017/084211, dated Feb. 20, 2018, 3 pages.

*Primary Examiner* — Lawrence D Ferguson
(74) *Attorney, Agent, or Firm* — Nixon & Vanderhye P.C.

(57) ABSTRACT

The invention relates to a multilayer composite comprising a layer of leather in contact with at least one monolayer comprising parallel aligned fibers and a matrix material. The composite may further comprise film layer(s) that may be breathable and/or waterproof. The multilayer composite material is suitable for use in clothing and outdoor gear and apparel.

12 Claims, 1 Drawing Sheet

(52) U.S. Cl.
CPC . *B32B 2260/023* (2013.01); *B32B 2262/0269* (2013.01); *B32B 2375/00* (2013.01)

(58) Field of Classification Search
CPC ...... B32B 2260/046; B32B 2262/0253; B32B 2262/0269; B32B 2307/516; B32B 2307/518; B32B 2307/52; B32B 2307/54; B32B 2307/544; B32B 2307/546; B32B 2307/558; B32B 2307/5825; B32B 2307/724; B32B 2307/7265; B32B 2307/734; B32B 2375/00; B32B 2437/00; B32B 2571/02; B32B 27/12; B32B 27/30; B32B 27/304; B32B 27/32; B32B 27/34; B32B 27/36; B32B 27/40; B32B 29/02; B32B 3/30; B32B 5/022; B32B 5/024; B32B 5/12; B32B 5/26; B32B 9/02; B32B 9/025; B32B 9/047; F41H 5/04; F41H 5/0478
See application file for complete search history.

(56) References Cited

U.S. PATENT DOCUMENTS

| | | |
|---|---|---|
| 2011/0023212 A1 | 2/2011 | Carroll et al. |
| 2015/0282544 A1 | 10/2015 | Lankes et al. |
| 2015/0328860 A1 | 11/2015 | Van Putten et al. |

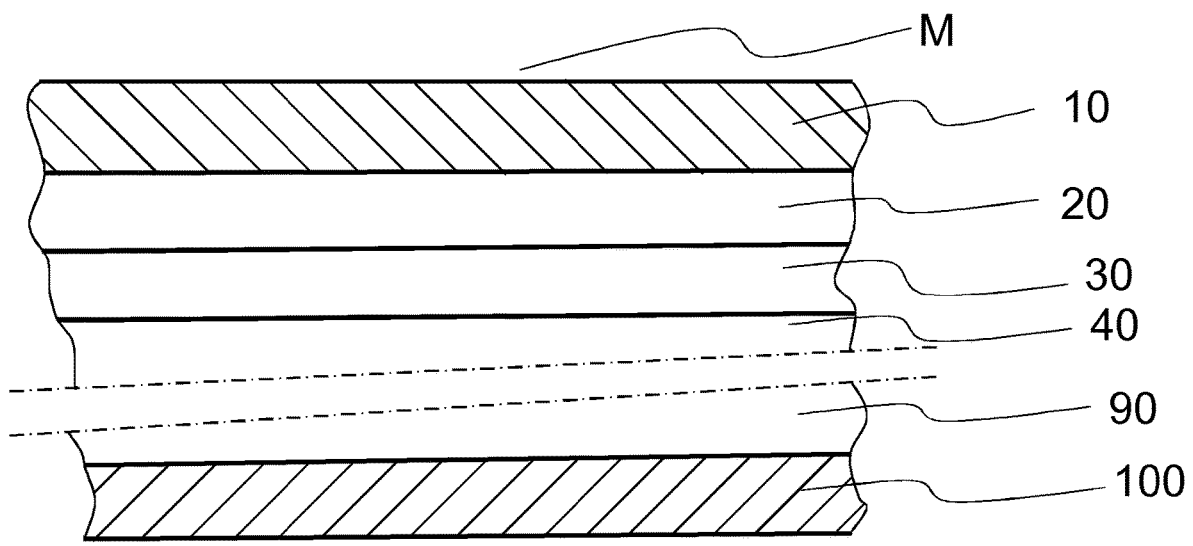

MULTILAYER COMPOSITE MATERIAL AND METHOD FOR MANUFACTURING

This application is the U.S. national phase of International Application No. PCT/EP2017/084211 filed 21 Dec. 2017, which designated the U.S. which claims the benefit of U.S. Application No. 62/439,996, filed 29 Dec. 2016, and claims priority to EP Patent Application No. 17152803.7 filed 24 Jan. 2017, the entire contents of each of which are hereby incorporated by reference.

The present invention generally relates to multilayer composite materials usable as ballistic blankets and in particular to a multilayer composite material comprising a layer of leather in contact with a monolayer of man-made fibers and methods for manufacturing same.

A ballistic blanket is part of the ballistic gear used around the world in law enforcement and in the military. Ballistic blankets find use, among other things, as coverings for bomb blast protection. Ballistic blankets have been disclosed, for example, by Carter, et al. in U.S. Pat. No. 7,389,718. This document discloses a ballistic blanket that encompasses an inner ballistic core encased in an outer housing. The inner ballistic core is covered with an inner cover. The inner ballistic core may be based on high performance fibers such as aramid or ultra-high molecular weight polyethylene ("UHMWPE"). Carter further discloses use of an aramid panel as an inner ballistic core, and that the inner cover may be made of nylon. Further, Carter teaches the outer housing may be made of fabrics, vinyl, leather or other pliable materials.

Although this document discloses products with acceptable properties, there is a continuous drive to develop further improved multilayer composite products such as ballistic blankets.

In various embodiments of the present disclosure, multilayer composite materials are described having further improvements in strength to weight ratio, reduced thickness, and additional aesthetics.

In general, the disclosure provides a multilayer composite comprising: a layer of leather; and a monolayer in contact with the layer of leather. The monolayer may comprise parallel fibers aligned in a single fiber direction along with a matrix material. The monolayer may also be referred to as a unidirectional layer. In some aspects, the multilayer composite may include one or more additional monolayers bonded thereon forming a stack of layers with the leather layer one of the outer layers. Each successive monolayer may be offset relative to an adjacent monolayer at up to 90° such that the parallel fibers in one monolayer are in a different direction relative to the parallel fibers in the adjacent layer. In this way, many monolayers may be used and the fiber direction may never be repeated, or several monolayers may be offset from each other until at some point the fiber direction in a layer repeats with a monolayer further below in the stack.

Each successive monolayer may comprise parallel fibers in a matrix material. The matrix material of each of the monolayers may be of different composition or the same. In various embodiments, a multilayer composite comprising a leather layer and one or more monolayers may further comprise at least one polymeric film in contact with any one monolayer such as to form an outer layer of the composite. In this way, a stack of monolayers may comprise the core of a composite having a leather layer and a film layer as the two exposed outer layers. In various examples, one or more film layers may be waterproof/breathable film, or waterproof and non-breathable film, or any combination of moisture passive and vapor passive.

In various embodiments, fibers used in the one or more monolayers may have strength of at least 0.5 GPa. In other examples, fibers may have strength of at least at least 2.5 GPa. Fibers may comprise UHMWPE or some other synthetic fiber. For example, fibers may comprise UHMWPE fibers having an intrinsic viscosity of at least 4 dl/g.

Each of the one or more monolayers within the multilayer composite may comprise a matrix material, for example in which the fibers are coated or embedded. Examples of matrix material include polyacrylate, polymers functionalized with acrylate groups, and polyurethane. Matrix material may have a stiffness of at least 3 MPa.

The fiber density in any one monolayer may be between 1 and 50 grams per square meter (g/m$^2$ or "gsm").

The present disclosure further provides a process for manufacturing a multilayer composite comprising: providing an assembly comprising a layer of leather; at least one monolayer comprising parallel aligned fibers and a matrix material; and optionally at least one polymeric film layer, the assembly having two outer surfaces, one being the layer of leather; and compressing the assembly at a pressure between 1 and 5 bar, and temperature between 35 and 120° C. During the compressing process, a cover C may be disposed on one or both of the outer layers, and the cover may be removable from the multilayer composite after the compressing step. Such a cover may have a texturing, and hence the pattern or texture on the cover may be imprinted onto either or both of the outer layers of the composite.

The multilayer composite described herein finds use in the manufacture of footwear, sports apparel, clothing, luggage, leather goods for animals, bags and luggage, hats, jackets, wallets, purses, bags, upholstery and gloves.

FIG. 1 depicts in cross-section an embodiment of a multilayer composite (M) in accordance to the present disclosure comprising: (10) a layer of leather; (20) a first monolayer; (30) an optional second monolayer; (40) an optional third monolayer; (90) an optional n$^{th}$ (4<n<8) monolayer; and (100) a film layer.

The multilayer composite material according to the invention comprises a layer of leather (10) in contact with a first monolayer (20), the monolayer comprising parallel aligned fibers and a matrix material. In the art, such monolayer comprising parallel aligned fibers and a matrix material are also referred to as unidirectional layer. For example, a monolayer herein may comprise parallel fibers embedded in a matrix material.

Leather in the context of the present invention refers to natural leather from various animal origins, often referred to as natural origin. In an alternative embodiment of the present invention, the multilayer composite material of the invention comprises artificial or faux leather, instead of natural leather.

The leather for use in the multilayer composites herein may originate from animal rawhide, typically from cattle, and but may also be sourced from reptiles, birds or other animals. Commonly used leather types originate from cow, calf, sheep and buffalo. More exotic leathers may have fish origin, such as salmon or eel skin, or may come from, for example, snake, crocodile, alligator, kangaroo, chicken, or elephant. Natural leather includes grain leather, including full grain, top grain and nubuck (top grain cattle leather than has been sanded or buffed), and corium leather, including suede, and also (finished) split leather. The leather may have had treatment, such as, for example, tanning, coloring, conditioning, waxing, sanding, buffing, tooling or embossing. In a preferred embodiment of the present invention, the leather is embossed after or during the formation of the multilayer composite material of the invention. The leather may be colored via aniline, semi-aniline or pigmented techniques, and may include a top coat such a wax finish or polish.

The leather layer for use herein may be of any thickness. In various embodiments, typical thicknesses range between 0.5-6 mm. Preferably the thickness of the leather ranges from 0.7-4 mm and more preferably between 0.7-2.8 mm.

A preferred multilayer composite material according to the present invention comprises calf leather as the leather layer, and preferably the calf leather has a thickness between 0.7 and 2.4 mm, and more preferably between 0.7 and 1.6 mm. These thickness ranges have been found to provide the supplest multilayered composites.

Those skilled in the art will understand that the invention can also be applied in multilayer composite materials that comprise leather alternatives and artificial or faux leather, such as so-called ocean leather made from kelp, bark or bark cloth, cork leather typically originating from cork-oak, natural fiber based alternatives such as cellulose fibers originating from several sources such as bamboo and pineapples, mushroom based materials like MuSkin, and glazed cotton. In various examples, recycled matter may be included in these alternative leathers.

Artificial leather includes, for example, polyurethane, vinyl and acrylic based artificial leathers, and combinations thereof. Furthermore, leatherette and polyester based leather alternatives such as recycled polyester (PET) degradable polyurethane, Alcantara® and Ultrasuede® find use herein.

An advantage of the composites according to the invention over the original (faux) leather materials is an increased consistency through which products better maintain their original shape and dimensions and are less susceptible to sagging. Furthermore, they are more durable, meaning that if they are applied a multitude (at least 1000) of times over edges with a low bending radius of e.g. 5 mm or less, they are less susceptible to crazing or tearing. Tearing is also of importance when composite sheets are assembled together via e.g. stitching. When the stitched parts are under tearing forces, a large part of the forces will concentrate on the stitched part, especially on the stitching fiber and the stitched holes. At that situation, tearing of/around the holes may occur. The better resistance against tearing makes endproducts, especially when they are under load, more durable.

A special preferred embodiment of the present invention relates to a composite that is based on a paper material instead of leather. This paper may be leather paper also known as parchment, but also printing paper, writing paper, drawing paper, photo paper, handmade paper, and card. The paper may have a thickness, often expressed as weight per surface area, of between 60 gram/m$^2$ and 200 gram/m$^2$ (as determined at ambient conditions of 23° C./50% RH, after first conditioning under these conditions for 24 hours), preferably between 70 gram/m$^2$ and 160 gram/m$^2$, more preferably between 80 gram/m$^2$ and 120 gram/m$^2$.

A special embodiment of paper relates to banknote paper. These often comprise cotton/linen base, but may also made of polymer, e.g. the polymer films as mentioned in this disclosure herein below. In various embodiments of the present disclosure, multilayer composites herein comprise banknotes. Banknotes having the structure of the multilayer composites herein are more tear resistant than ordinary banknotes, while having a recognizable hand feel.

Another preferred embodiment of the present invention relates to a composite that is based on a cotton, wool or linen layer instead of leather. Cotton, wool or linen layers may be woven structures. In various embodiments, a canvas for paintings is based on such a composite. Paint in the painting on such canvass will be less susceptible to cracking over time, even after a 50-year time period or longer.

The leather layer in the multilayer composite may optionally be covered on its exposed side, i.e. the side opposite to the first monolayer, with a film layer as further explained below. An alternative to the film layer may be a coating or an alternative thereof, such as materials applied by vacuum deposition. A film layer over the outer leather layer may be used to give special visual appearance to the composite and for protecting the leather, e.g. against harsh outdoor conditions such as sea-salt, or against staining.

The multilayer composite material according to the invention comprises a first monolayer comprising parallel aligned fibers and a matrix material.

The monolayer may be obtained by orienting a plurality of fibers in parallel fashion in one plane, for instance by pulling a number of fibers or yarns from a fiber bobbin frame over a comb, and impregnating the fibers with the matrix material in a way known to the skilled person, before, during or after orienting. In this process, the fibers may have been provided with a finish with at least one component or polymer other than the plastic matrix material in order to, for instance, protect the fibers during handling or in order to obtain better adhesion of the fibers onto the plastic of the monolayer. Preferably, fibers without a finish are used. The fibers may have been surface treated before finishing or before contacting the fibers with the matrix material. Such treatment may include treatment with chemical agents such as oxidizing or etching agents, but preferably includes plasma or corona treatment.

The amount of fiber in one monolayer is generally between 1 and 50 grams per square meter. The amount of fiber may also be referred to as the fiber density of a layer. Preferably the amount of fiber in one monolayer is between 2 and 30 grams per square meter, and more preferably between 3 and 20 grams per square meter. It has been found that fiber densities in these ranges help to maintain flexibility of the multilayer composite material according to the present invention.

The matrix material used in the monolayer preferably comprises a thermoplastic material. Particularly suitable are those matrix materials that can be dispersed in water prior to application. Examples of suitable polymer materials include, but are not limited to, polyacrylates, polyurethanes, modified polyolefins and ethylene copolymers, including SEBS and SIS polymers, such as known in the field of ballistic resistant articles, and ethylene vinyl acetate.

Preferably, the matrix material contains a type of polyurethane. For example, the polyurethane may comprise a polyether-urethane based on a polyetherdiol, which provides good performance over a wide temperature range. In another example, the polyurethane may comprise a polyester-urethane based on a polyetherdiol, which provides good performance over a wide temperature range.

In a special embodiment, the polyurethane or polyether-urethane is based on aliphatic diisocyanates as this further improves product performance, including its color stability. Furthermore, the shape coherence is improved, whereby an endproduct better retains its original shape. The 100% modulus of these matrix materials for use in the monolayers is preferably at least 3 MPa. More preferably the 100% modulus is at least 5 MPa. The 100% modulus is generally lower than 500 MPa.

In another preferred embodiment, especially where suppleness of the composite it of utmost importance, a matrix material is preferably used that has a 100% modulus of at most 2 MPa. More preferably the 100% modulus is at most 1.5 MPa, most preferably the 100% modulus is at most 1.0 MPa. A suitable matrix material may be Kraton®, that may suitably be applied from an aqueous dispersion.

In a yet further preferred embodiment, the matrix material may comprise an acrylic based resin, or a polymer comprising acrylate groups.

Yet a further type of matrix material comprises a homopolymer or copolymer of ethylene and/or propylene, wherein the polymeric resin has a density as measured according to ISO1183 in the range from 860 to 930 kg/m$^3$, a peak melting temperature in the range from 40° to 140° C. and a heat of fusion of at least 5 J/g.

Further details of matrix systems and monolayers with unidirectional fibers may be found, for example, in U.S. Pat. No. 5,470,632, incorporated herein by reference in its entirety.

The amount of matrix material in one monolayer is typically between 10 and 95 wt %; preferably between 20 and 90 wt %, more preferably between 30 and 85 wt %, and more preferably between 35 and 80 wt %. This ensures adequate bond strength between the leather and/or monolayer(s), and other components, thereby reducing the chance for premature delamination in the composite after repeated flexural cycles.

The matrix material in second and subsequent monolayers may be the same as in the first monolayer, but also may differ. In various embodiments, a multilayer composite comprises a first monolayer comprising parallel fibers in a first matrix material and a second monolayer comprising parallel fibers in a second matrix material.

A used herein, term "fiber" is meant to include not only a monofilament but, inter alia, also a multifilament yarn or tapes.

Tapes may be made by various known techniques including solid state polymer processing, gel technology and fiber fusion. Tapes have a width to thickness ratio of at least 5, preferably at least 10, more preferably at least 100, and most preferably of at least 1000.

Suitable fibers for use in the multilayer composite material according to the invention may be carbon fibers.

Especially suitable fibers for use in the multilayer composite material according to the invention include, for example, fibers based on polyamides, including polyamide 6, and 6.6; and polyesters, including polyethylene terephthalate; polypropylene and polyethylene. Furthermore preferred fibers include aromatic polyamide fibers (also often referred to as aramid fibers), especially poly(p-phenylene teraphthalamide); liquid crystalline polymer and ladder-like polymer fibers such as polybenzimidazoles or polybenzoxazoles, such as poly(1,4-phenylene-2,6-benzobisoxazole) (PBO), or poly(2,6-diimidazo[4,5-b-4',5'-e]pyridinylene-1,4-(2,5-dihydroxy)phenylene) (PIPD; also referred to as M5); polyaryl ether ketones including polyether ether ketone and fibers of, for example, polyolefins, polyvinyl alcohol, and polyacrylonitrile which are highly oriented, such as obtained, for example, by a gel spinning process. Highly oriented polyolefin, aramid, PBO and PIPD fibers, or a combination of at least two thereof are preferably used. Highly oriented polyolefin fibers include polypropylene and polyethylene fibers and have a tensile strength of at least 1.5 GPa.

Specially preferred are high performance polyethylene fibers, also referred to as highly drawn or oriented polyethylene fibers consisting of polyethylene filaments that have been prepared by a gel spinning process, such as described, for example, in GB 2042414 A or WO 01/73173. The advantage of these fibers is that they have very high tensile strength combined with a light weight, so that they are in particular very suitable for use in extremely thin layers. Preferably, use is made of multifilament yarns of ultra-high molar mass polyethylene with an intrinsic viscosity of at least 5 dl/g, more preferably these polyethylene yarns have an intrinsic viscosity of at least 8 dl/g. An advantage of a such a value of intrinsic viscosity value relates to higher tearing strengths of the composites according to the invention, especially where it relates to stitching and connections of composites, such as seams, made by stitching.

The titer of a single filament of these fibers or yarns is generally less than 10 denier, preferably less than 5 denier, more preferably less than 3 denier, even more preferably the titer of a single filament of these fibers is less than 2 denier. This results in a better drapability of the multilayer composite material of the invention.

The fibers in the multilayer composite material of the invention typically have a tensile strength of at least 0.5 GPa, preferably at least 0.6 GPa, more preferably at least 0.8 GPa. In a preferred embodiment the strength of the fibers, preferably polyethylene fibers, is at least 3.0 GPa, preferably at least 3.5 GPa, more preferably at least 4.0 GPa and most preferably at least 4.5 GPa. For economic reasons, the strength of the fibers is preferably less than 5.5 GPa. The fibers preferably have a tensile strength of between 3.1 and 4.9 GPa, more preferably between 3.2 and 4.7 GPa, and most preferably between 3.3 and 4.5 GPa.

The fibers in the second and subsequent monolayers may be the same as in the first monolayer, but also may differ per monolayer.

One alternative embodiment relates to an in-layer-hybrid, where at least 2 of the above-mentioned fibers are used in one and the same monolayer.

With reference to FIG. 1, a multilayer composite material according to the invention may further comprise a second monolayer (30) comprising parallel aligned fibers and matrix material in contact with the first monolayer (20). In a multilayer composite with two such monolayers having parallel fibers, the fiber direction in the second monolayer (30) may be rotated or "offset" to the fiber direction in the (adjacent) first monolayer (20), such as to a smallest angle of more than 0° and at most 90°.

For further fine tuning the properties of the multilayer composite material, one may decide to add a third monolayer (40) and subsequent monolayers, up to n monolayers, in contact with and rotated relative to an adjacent monolayer to offset the fiber directions. In various embodiments, the total number of monolayers, n, may be between about 4 and about 8, (4<n<8). Depending on the application, the value of n may be chosen to suit the particular application or end use. In the multilayer composite material according to the invention, each monolayer may be rotated relative to a previous monolayer.

In addition to the monolayers, the multilayer composite material may further comprise a scrim layer. A scrim layer is a very light textile with an open weave of fibers laminated preferably into the multilayer composite material, that may provide extra stability.

Another preferred embodiment of the present invention comprises a multilayered composite material, comprising a first outer layer of a first layer of leather; in contact with a first monolayer comprising parallel aligned fibers and a matrix material, at least one subsequent monolayer rotated versus the first monolayer and a second outer layer of leather. This creates a product with full leather outside, while still benefitting from the properties of the composite that is present.

A preferred embodiment of the present invention comprises a multilayered composite material, comprising a layer of leather; in contact with a first monolayer comprising parallel aligned fibers and a matrix material, and 3 subsequent monolayers, at least one of the monolayers having less than 20 grams per square meter of fiber. Preferably at least two of the monolayers having less than 20 grams per square meter of fiber. Optionally this multilayered composite material has a film at the outer side, opposite to the layer of leather. The fiber direction in adjacent monolayers is rotated at a smallest angle of more than 0° and at most 90°.

With continued reference to FIG. 1, the multilayer composite material according to the invention may further comprise a polymeric film (100). Preferably such polymeric film is disposed in contact with the outermost monolayer on the side opposite the leather layer. In this way the layer of leather and the film layer form outer layers of the multilayer composite material according to the invention.

The film used may comprise, for example, a polyolefin film, including linear low-density polyethylene available under the Stamylex® trademark, polypropylene films, and polyester films.

In a preferred embodiment, the film is a biaxial stretched polyolefin film. Examples hereof are biaxial stretched high-density polyethylene and biaxial stretched polypropylene film.

Another type of film for use in the multilayer composite material according to the invention is a metal foil or metal coated film, a fabric or a non-woven.

In a further preferred embodiment, the polymeric film is a waterproof/breathable (W/B) film. The W/B film functions as a barrier layer that permits the transfer of gas, including water vapor, through the materials but not the transfer of liquid water. Such films include ECTFE and EPTFE branded as Gore-Tex® and eVent®, aliphatic polyurethane, aromatic polyurethane, polyamide, polyester, PVF, PEN, specially engineered with UHMWPE membranes, such as for example Solupor® membrane, and microporous polypropylene membranes.

A special embodiment of W/B film in the present invention may be in the form of a woven fabric, such fabric may be coated or (partially) impregnated with a matrix material to allow for its W/B properties.

Another special embodiment of the W/B film in the present invention may be in the form of a non-woven fabric, such fabric may be coated or (partially) impregnated with a matrix material to allow for its W/B properties. A typical example of a non-woven fabric includes a felt.

Thickness of these films generally is between 1 and 50 micrometers, and preferably between 2 and 25 micrometer.

An advantage of such (W/B) polymeric film is that it may prevent the leather from being stained on that surface and add barrier properties that the leather, monofilament and matrix layers would not otherwise have. Additionally, a film may add a texture that is softer to the touch or add abrasion resistant properties.

The multilayer composite material according to the invention may suitably be made by stacking the required layers of leather and monolayer(s), and the mentioned optional layers and compress these at an absolute pressure of between 1.05 and 5 bar, preferably at an absolute pressure of between 1.1 and 4 bar, more preferably at an absolute pressure of between 1.2 and 3 bar. Compressing under these conditions is accomplished in a static press, including an autoclave. Preferably a continuous press is used in the form of a calendar or a continuous belt press. The temperature during compression is preferably between 35° and 120° C. More preferably the temperature during pressing is between 40 and 100° C. and most preferably the temperature during pressing is between 45 and 90° C. This delivers composites with better flexing properties and are less prone to surface cracking after repeated flexing. Alternatively, the composites are less prone to surface deteriorations during processing. For example, when sheets of composites according to the invention are stitched together, puncture holes during stitching suffer less from deteriorations or deformations, meaning they are narrower and clearer, defined without enlargements or cracking or crazing of the punctured hole. This is very beneficial for performance products where e.g. visual appearance is important.

The time of pressure and temperature treatment varies by the intended end use and can be optimized via simple trial and error experiments. A typical time for pressing varies between 30 seconds and 30 minutes.

In a special version of the process to manufacture the multilayered composite material at least one of both outer surfaces of the composite is in contact with, preferably a removable, cover during the pressure and temperature treatment. The cover may be a fiberglass reinforced PTFE sheet, or may be a steel belt, in e.g. a continuous belt press, optionally with a release layer e.g. in the form of a siliconized paper. An alternative form of such a removable cover comprises a soft material based on rubber. The Shore A value of the rubber is less than 95, more preferably less than 80 and preferably at least 50, as determined by Durometer test per ISO 7619. In an even more preferred version of the process, the multilayered composite material is sandwiched between 2 such covers.

The process to manufacture the multilayered composite material may comprise placing the leather layer in contact with a removable cover, the removable cover having a pattern according to a preset design for embossing or texturizing the leather surface layer of the multilayered composite material during its manufacture in the pressure and temperature treatment. The embossing may also take place for both outer layers of the composite according to the invention. This process yields a further improved multilayered composite material according to the invention, which due its texturized surface, may find its use in various application areas.

After the pressure and temperature treatment to obtain the multilayered composite material according to the invention, the material may be further post treated in order to further improve its flexibility by e.g. flexing the composite material in multiple directions. Such flexing may suitably be done by bending over short radii.

The multilayer composite according to the invention as well as the texturized multilayer composite according to the invention can suitably be used in the manufacture of footwear, sports apparel, clothing, luggage; leather goods for animals including straps, lashes and saddles, bags and luggage. Furthermore in hats/jackets, wallets, purses, bags, upholstery, gloves, including workwear gloves and sports gloves, such as baseball gloves, sailing gloves, and the like.

Test Methods

The following are test methods as referred to herein:

The Intrinsic Viscosity (IV) of UHMWPE is determined according to ASTM D1601, at 135° C. in decalin, the dissolution time being 16 hours, with DBPC as anti-oxidant in an amount of 2 g/l solution, by extrapolating the viscosity as measured at different concentrations to zero concentration.

Tensile properties (measured at 25° C.): tensile strength (or strength), tensile modulus (or modulus) and elongation at break are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titer, as determined by weighing 10 meters of fiber; values in GPa are calculated assuming a density of 0.97 g/cm$^3$. Tensile properties of thin films are to be measured in accordance with ISO 1184(H).

The modulus of the matrix material is to be determined according to ISO 527. The 100% modulus was determined on film strips with a length of 100 mm (free length between the clamps) and a width of 24 mm. The 100% modulus is the secant modulus measured between strains of 0% and 100%.

Heat of fusion and peak melting temperature have been measured according to standard DSC methods ASTM E 794 and ASTM E 793 respectively at a heating rate of 10K/min for the second heating curve and performed under nitrogen on a dehydrated sample.

The invention claimed is:

1. A multilayer composite comprising:
    a first monolayer comprising parallel ultrahigh molecular weight polyethylene (UHMWPE) fibers aligned in a first fiber direction and at least one first matrix material; and
    a layer of leather having a thickness of between 0.5-6 mm in contact with the first monolayer, wherein
    fibers are present in the first monolayer in an amount to provide a fiber density of between 2-30 grams per square meter, and wherein
    the at least one first matrix material has a stiffness of at most 2 MPa.

2. The multilayer composite of claim 1 further comprising:
    a second monolayer in contact with the first monolayer, wherein
    the second monolayer comprises parallel fibers aligned in a second fiber direction and a second matrix material, and wherein
    the first monolayer is rotated relative to the second monolayer in the multilayer composite such that the second fiber direction is offset relative to the first fiber direction by up to 90 degrees.

3. The multilayer composite of claim 2, further comprising:
    additional monolayers of parallel fibers, wherein each of the additional monolayers comprise parallel fibers and a matrix, wherein
    the additional monolayers are stacked and arranged in the multilayer composite such that one monolayer of the additional monolayers is in contact with the second monolayer, and wherein each successive monolayer of the additional monolayers is rotated relative to an adjacent monolayer such that fiber directions are offset in each successive monolayer.

4. The multilayer composite of claim 3, further comprising a polymeric film in contact with a monolayer such as to form an outer layer of the composite.

5. The multilayer composite of claim 4, wherein the polymeric film is waterproof/breathable.

6. The multilayer composite of claim 1, wherein the strength of the UHMWPE fibers is at least 0.5 GPa.

7. The multilayer composite of claim 1, wherein the strength of the UHMWPE fibers is at least 2.5 GPa.

8. The multilayer composite of claim 1, wherein the UHMWPE fibers have an intrinsic viscosity of at least 5 dl/g.

9. The multilayer composite of claim 1, wherein the at least one first matrix material is at least one selected from the group consisting of polyacrylates, polymers functionalized with acrylate groups, and polyurethanes.

10. The multilayer composite of claim 3, wherein the UHMWPE fibers are present in the second monolayer and any one of the additional monolayers at a fiber density of between 1 and 50 grams per square meter.

11. A process for manufacturing a multilayer composite comprising:
    (a) providing an assembly comprising:
        (i) a layer of leather having a thickness between 0.5-6 mm in contact with a removable cover which includes a pattern for embossing or texturizing the leather surface,
        (ii) at least one monolayer comprising parallel aligned fibers and a matrix material, and
        (iii) optionally at least one polymeric film layer, wherein
        the assembly has two outer surfaces, wherein one of the outer surfaces is the layer of leather in contact with the removable cover; and
    (b) compressing the assembly at a pressure between 1 and 5 bar and a temperature between 35 and 120° C.

12. An article which comprises the multilayer composite of claim 1, wherein the article is selected from the group consisting of footwear, sports apparel, clothing, luggage, leather goods for animals, bags and luggage, hats, jackets, wallets, purses, bags, upholstery and gloves.

* * * * *